Aug. 20, 1957   R. M. BRISSEY, JR., ET AL   2,803,056
METHOD OF APPLYING AN ELASTIC INSULATING TUBE TO A CONDUCTOR BAR
Filed Jan. 4, 1954
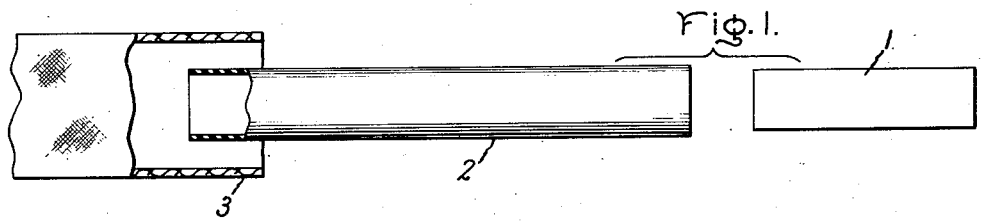
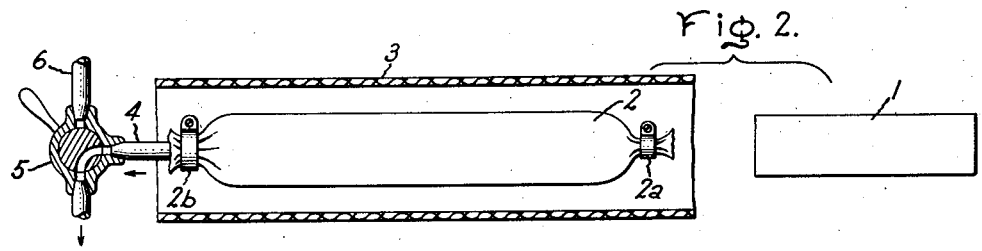
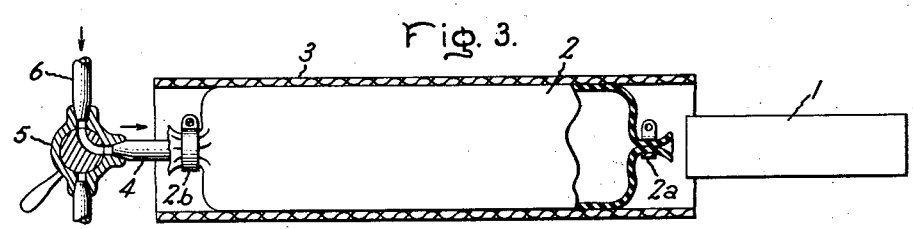
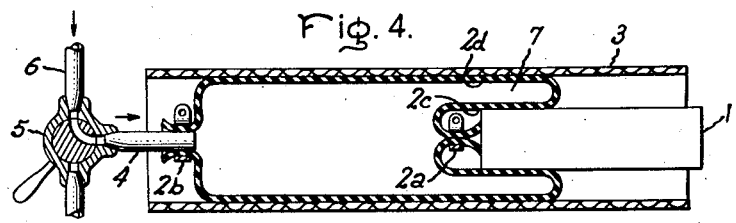
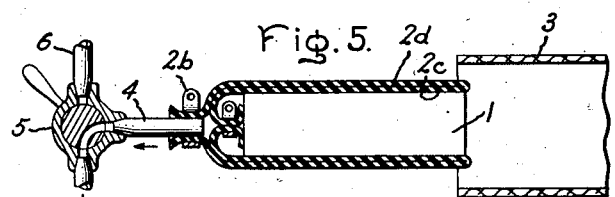
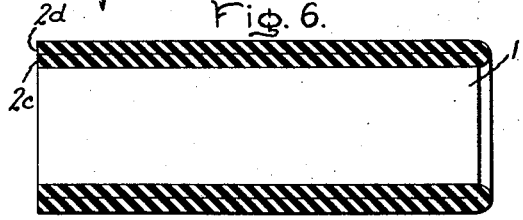
Inventors:
Ruben M. Brissey Jr.,
George W. Roberts,
by Kiess
Their Attorney.

United States Patent Office 2,803,056
Patented Aug. 20, 1957

2,803,056

METHOD OF APPLYING AN ELASTIC INSULATING TUBE TO A CONDUCTOR BAR

Ruben M. Brissey, Jr., Danvers, and George W. Roberts, Lynn, Mass., assignors to General Electric Company, a corporation of New York Application January 4, 1954, Serial No. 402,106

4 Claims. (Cl. 29—450)

This invention relates to insulating electrical conductors, particularly to a method of applying an elastic tube of insulating material to the conductor bar of a large generator or like dynamo-electric machine.

Generators, on the order of 2000 to 20,000 kw. capacity, customarily have armatures formed of longitudinally extending conductor bars, which may range in cross section from ½ x 1" to ½ x 2½". Heretofore, such conductors have been insulated by winding multiple layers of various types of insulating tape, and impregnating the taped conductor with a suitable insulating material, which may then be cured or baked to produce a homogeneous insulating coating on the conductor. Such previously used processes have also necessitated a pressing or molding operation after the tape is applied, in order to produce a compact coating of uniform thickness and of the proper over-all size and shape that the conductor will fit the slots in the rotor or stator armature of the generator.

In recent years, consideration has been given to the possibility of insulating a dynamoelectric machine conductor bar with an elastic material such as a suitable synthetic rubber. The so-called "silicone rubbers" have been thought to be particularly appropriate in view of their high resistance to corona, which is second only to that of the mica materials currently in use. Silicone rubbers, such as that known to the trade as General Electric SE–450, are found to have excellent high voltage insulating qualities and resistance to deterioration under high energy corona, which deterioration has been an obstacle to utilization of other synthetic plastic materials as generator insulation. Other compounds formulated from General Electric SE–76 base gum silicone rubber may also be applicable. Generally speaking, these comprise organopolysiloxanes, for instance methyl polysiloxanes, which can be mixed with various suitable fillers, such as finely divided silica, and vulcanizing agents such as benzoyl peroxide, and then maintained at elevated temperatures to effect conversion to the "cured" solid elastic state. Such materials are disclosed, for instance, in the United States patents to Agens— 2,448,756 and Warrick—2,541,137.

Having conceived that silicone rubbers of the type described may be suitable for the insulation of large dynamoelectric machines, it became necessary to find a practicable method of applying the material to the conductor bar. Possible methods include using the rubber in the form of a tape, as with the mica tapes previously used, or extruding a coating directly onto the conductor bar. Extruded coatings seem less desirable than taped coatings because of the importance of having multiple layers of the insulating medium, in order that any discontinuity or defect in a single layer will not produce a serious weakness in the total thickness of the insulating material. The disadvantages of tape lie in the substantial amount of labor required to apply it, the high degree of skill required, and the fact that taping may leave air spaces between adjacent butt-lapped turns, the alternative being bulky overlapped joints between adjacent turns.

Accordingly, the present invention has for its object to provide an improved method of applying multiple layers of an elastic insulating material in such a manner that labor costs and time involved are greatly reduced, while achieving a multiple layer insulating coating which is compact and homogeneous, without the necessity of pressing, molding, or curing operations.

Other advantages and objects will become apparent from the following description taken in connection with the accompanying drawings, in which Figures 1–6 inclusive are diagrammatic representations of the steps which comprise the process.

Generally stated, the invention is practiced by sealing both ends of the tube to be applied to the conductor bar, inflating the tube, inverting one end of the inflated tube over the end of the conductor bar, "rolling" the tube longitudinally onto the conductor, and then deflating the tube so that a double layer of the tubing material is deposited snugly around the conductor.

Referring now more particularly to the drawings, Figure 1 shows the conductor bar 1 to be insulated, the tube of resilient insulating material 2, and a flexible woven sleeve 3 employed to facilitate application of the tube to the bar.

The conductor 1 is shown as being a plain straight bar, but it is to be understood that the method is also applicable to formed bars having variously curved end portions for adapting them to the stator or rotor armature of the dynamoelectric machine. In order to make the drawings of a scale large enough to show details clearly, the conductor 1 is shown very much shorter in relation to its cross section than would be the case in an actual generator conductor bar. Actually the bar may be ½ x 2½", or larger, in cross section and up to 10 feet, or more, in length.

As noted above, the elastic tube 2 is of a material such as the silicone rubber known commercially as General Electric SE–450 or other materials such as "Silastic" compounds having the required elasticity, mechanical strength, chemical stability and high voltage endurance. The tube is chosen of such a diameter that it will remain stretched 10 to 15% when in final position on the conductor, thus insuring a tight fit, without air spaces. Specifically, for a conductor measuring .835 x .365 inch in cross section, the tube may be ¾ inch inside diameter, and having a wall thickness of .030 inch. It has been found readily possible to apply such a tube of a length up to 12 feet to a conductor bar having a length of 5½ feet.

The woven sleeve 3 may not be absolutely necessary in all cases but has been found convenient for controlling the degree of inflation of the tube, preventing "blow-outs" if there should be any weak places or imperfections in the wall of the tubing. Sleeve 3 may be formed of any sufficiently strong flexible woven fabric or wire braid material.

Figure 2 illustrates the first step in the process of applying the tube to the conductor. The woven sleeve 3 is positioned over the tube 2 as shown. One end of the tube is sealed or clamped shut at 2a, and the other end is sealed as by means of a band clamp 2b to the end of a nozzle 4. A suitable fluid, such as air under pressure, is supplied to nozzle 4 by a three-way valve 5 which in one position admits air pressure through supply conduit 6 and in a second position vents the interior of the tube to atmosphere.

Figure 3 shows how the application of fluid pressure through nozzle 4 causes the resilient tube 2 to expand into contact with the inner surface of sleeve 3. Tube 2 is inflated to a pressure which may be anywhere from about three or four lbs. per sq. in. up to twenty lbs. per sq. in. Three or four lbs. may be sufficient in most cases, but the tube is inflated until it becomes sufficiently firm that it can be handled as if it were a rigid body. The presence of the woven retaining sleeve 3 permits use of any desired inflation pressure required to make the tube firm enough to handle, without danger of "blowing out" any weak portion of the tube wall.

As also shown in Figures 3 and 4, the conductor 1 is brought up to the sealed end of tube 2 and inserted so as to "invert" the end of the tube. The dimension of the sleeve 3 relative to the conductor 1 is such that a substantial air space is defined, as shown in Figure 4, between the inner or "inverted" portion 2c of the tube and the exterior or "uninverted" portion 2d. This air space is indicated at 7, and is particularly significant because it serves the dual function of (1) forcing the inverted tube portion 2c inwardly into firm contact with the surface of the conductor 1, and (2) expanding the uninverted portion 2d away from the portion 2c so as to eliminate friction therebetween.

It will be apparent to those familiar with silicone rubbers that, if the coaxial portions 2c, 2d came in contact with each other with any substantial amount of force, the resulting friction would make it impossible to "roll" the tube onto the conductor. Because of the firmness of the inflated tube, and the friction-preventing effect of the air space maintained at 7, it is found possible to readily work an insulating tube over a conductor, even if the conductor has substantial bends for the tube to pass around.

It will be apparent from Figure 4 how the inflated portion 2d of the tube progressively "rolls" into contact with the surface of conductor 1 as the conductor moves axially into the end of sleeve 3. When the conductor 1 is disposed entirely within the sleeve 3, the valve 1 is moved to the "vent" position, as shown in Fig. 5. Release of the pressure inside tube 2 and in the air space 7 of course permits the outer convolution 2d to contract snugly into contact with the inner tube portion 2c, thus insuring that no air spaces will remain between the two layers. The "rolling" action by which the inner portion 2c is deposited on the outer surface of conductor 1 likewise insures the absence of air pockets between the conductor and the inner layer 2c.

With the tube 2 deflated, the sleeve 3 is removed and the air supply end of the tube trimmed off as illustrated in Figure 6, to complete the process. It will be apparent that the right-hand end of the double layer of tubing may also be trimmed off, if desired.

It will be apparent that this cycle of operations has resulted in the application of two thicknesses of insulating tubing to the conductor 1. The residual tension in the slightly stretched tubing insures that the insulation will fit the conductor perfectly, without air voids, without the bulk resulting from the lapped joints of tape coverings, and without the danger of discontinuities in the insulating material as might result if tape is applied without adequate lap between adjacent turns.

With the conductor insulated with two thicknesses of tubing as in Figure 6, the process can be repeated, applying two layers at a time, until any desired insulation thickness is attained. A total thickness of six layers of rubber is found desirable, although four thicknesses have been used successfully. In this connection, it is convenient to use a woven sleeve 3 of sufficient diameter that it can be used for applying both the original tube and any succeeding tubes required to produce a coating of the required total thickness. This is possible since the silicone rubber has an elongation of at least 300%, which makes it feasible to inflate the tubes 2 sufficiently that tubes having the same original uninflated dimensions may be used for succeeding layers.

After the requisite number of layers of tubing have been applied, the conductor bar may, if desired, be finished with an outer protective coating of woven glass fiber tape (not shown), or the equivalent.

This method of insulating a dynamoelectric machine conductor bar has the very substantial advantage that no subsequent pressing, impregnating, molding, or curing operations are required to compact the insulation and form it to its final desired shape. The resulting cover is found to have a lower power factor than coatings provided by conventional methods, and at the same time it has a high dielectric strength.

The major advantage of the invention is that it permits a tremendous decrease in the degree of skill of the labor required and in the length of time for insulating a conductor bar. For instance, whereas previous methods using tape required a manufacturing cycle of something like twenty hours working time, extending over a total period of eighteen days, the invention permits application of the insulation in something like fifteen minutes, plus perhaps another hour for miscellaneous handling and preparation time.

While modifications will occur to those skilled in the art, it is desired to cover by the appended claims all such changes as fall within the true spirit and scope of the invention. It will also be observed that the invention may be applicable to applying analogous resilient tubes to other objects and for purposes other than insulating an electrical conductor.

What we claim as new and desire to secure by Letters Patent of the United States is:

1. The method of applying a length of elastic tubing over an elongated body which comprises closing one end of a length of tubing, sealing the other end of the tube to a fluid pressure supply nozzle, injecting fluid under pressure through said nozzle into the closed tube to inflate it, moving the closed end of the tube relative to an end portion of the body to cause said closed tube end to invert over the end of the body, the fluid pressure in the tube being adequate to hold the outer tubing wall substantially spaced from said inverted end portion of the tube, moving the inflated tube longitudinally relative to the body to cause the outer tubing portions to progressively become inverted and roll into contact with the surface of the body, until the body is disposed substantially within the outer wall portion of the tube, and releasing the fluid pressure within the tube to cause the outer portion to contract into engagement with the inner inverted tube portion.

2. The method of applying a length of elastic tubing over an elongated body which comprises closing one end of the tube, sealing the other end of the tube to a fluid pressure supply nozzle, admitting fluid under pressure through said nozzle to inflate the tube, moving said first closed end of the tubing relative to the adjacent end of said body to cause the closed tube end to invert over the end of the body, the fluid pressure admitted to the tube being adequate to space the outer tubing wall from said inverted end portion of the tube and thereby prevent friction between the outer and inner tubing portions, moving the outer inflated tube portion longitudinally relative to said body to cause it to progressively invert into contact with the surface of the body, until the body is disposed substantially within the outer wall portion of the tube, releasing the fluid pressure within the tube, whereby the outer layer of tubing contracts tightly into engagement with the inner inverted layer, and trimming off the fluid admission nozzle end portions of the tubing.

3. The method of applying a length of elastic tubing to an elongated body which comprises sealing one end of the length of tubing, sealing the other end of the tubing to a fluid pressure supply nozzle, admitting fluid under pressure through said nozzle to inflate the tubing, moving said first sealed end of the tubing relative to the adjacent end of said body to cause the sealed tube end to invert over the end of the body, the fluid pressure in the tube being adequate to maintain the outer tubing wall spaced radially from said inverted end portion of the tube, moving the inflated tube longitudinally relative to the body to cause the tube to progressively become inverted and roll into contact with the surface of the body, until the body is disposed substantially within the outer wall portion of the tubing, and deflating the tube to cause the outer layer to contract into engagement with the inner inverted layer.

4. The method of applying a double layer of elastic tubing to an elongated body which comprises selecting a tube of a length substantially twice the length of the body portion to be covered and having an initial perimeter less than that of the body, closing one end of the length of tubing, sealing the other end of the tube to a fluid pressure supply nozzle, positioning around the tube a flexible but relatively inelastic retaining sleeve of a perimeter substantially larger than that of the tube, admitting fluid under pressure through said nozzle to inflate the tube into firm contact with the retaining sleeve, moving said first closed end of the tube relative to an end portion of the body to cause the closed tube end to invert over the end of the body, the fluid pressure admitted to the tube being adequate to hold the outer tubing wall spaced from said inverted end portion of the tube, moving the retaining sleeve with the inflated tube longitudinally relative to the body to cause the outer tubing portions to progressively become inverted and roll into contact with the surface of the body, until the body is disposed substantially within the outer wall portion of the tube, deflating the tube to cause the outer portion to contract away from the retaining sleeve and into engagement with the inner inverted tube portion, and trimming at least the sealed fluid admission end of the tubing to remove excess tubing and expose the end of the body.

References Cited in the file of this patent
UNITED STATES PATENTS

| | | |
|---|---|---|
| 2,446,281 | Harding | Aug. 3, 1948 |
| 2,517,584 | Mapes | Aug. 8, 1950 |
| 2,518,483 | Mapes | Aug. 15, 1950 |
| 2,645,004 | Dorner | July 14, 1953 |
| 2,718,052 | Dexter | Sept. 20, 1955 |
| 2,733,572 | Butterfield | Feb. 7, 1956 |